United States Patent [19]

Matsuda et al.

[11] 3,972,055
[45] July 27, 1976

[54] MULTI-EXPOSURE CONTROL DEVICE FOR CAMERAS

[75] Inventors: Motonobu Matsuda, Izumi; Norio Beppu, Sennan; Hiroshi Ueda, Nara, all of Japan

[73] Assignee: Minolta Camera Kabushiki Kaisha, Osaka, Japan

[22] Filed: July 21, 1975

[21] Appl. No.: 597,433

[52] U.S. Cl. ............................ 354/24; 354/28; 354/29; 354/30; 354/36; 354/40; 354/50; 354/60 R
[51] Int. Cl.² ....................................... G03B 7/08
[58] Field of Search ............... 354/24, 26, 28, 29, 354/30, 36, 37, 38, 40, 41, 43, 47, 48, 50, 51, 60 R

[56] References Cited
UNITED STATES PATENTS

| | | |
|---|---|---|
| 3,464,332 | 9/1969 | Davison et al. .................. 354/30 |
| 3,491,670 | 1/1970 | Rentschler ........................ 354/30 |
| 3,563,141 | 2/1971 | Stanp ............................... 354/30 |
| 3,893,133 | 7/1975 | Tsujimoto et al. ................ 354/24 |
| 3,898,675 | 8/1975 | Ono .................................. 354/24 |
| 3,899,789 | 8/1975 | Taguchi ............................ 354/51 |

Primary Examiner—Joseph F. Peters, Jr.
Attorney, Agent, or Firm—Watson, Cole, Grindle & Watson

[57] ABSTRACT

The multi-exposure control device is provided with an automatic mechanism for stopping-down the diaphragm from an open position prior to exposure. A diaphragm adjusting ring stops the stopping-down operation at the pre-selected diaphragm aperture. An automatic exposure time control signal is generated from the light passing through the objective lens and stopped-down diaphragm aperture. A shutter speed selecting member provides a first mode for manual selection of the shutter speed and a second mode for automatic shutter exposure control.

4 Claims, 8 Drawing Figures

MULTI-EXPOSURE CONTROL DEVICE FOR CAMERAS

BACKGROUND OF THE INVENTION

This invention relates to a multi-exposure control device for use in a camera, and more particularly to a multi-exposure control device of the type described, which is switchable between an exposure control mode wherein the shutter speed and diaphragm aperture are manually determined, and an automatic exposure control mode. In addition, the multi-exposure control device corresponding switchable between an automatic exposure control mode wherein the shutter speed is controlled, with the diaphragm aperture determined preferentially beforehand, and another automatic exposure control mode wherein the diaphragm aperture is controlled, with the shutter speed selected preferentially beforehand.

It is known that exposure may be determined depending on a preadjusted diaphragm aperture and selected shutter speed, if the film speed is known and taken into consideration. In this connection, an exposure control system is known, in which prior to exposure the diaphragm aperture is adjusted and the shutter speed is selected manually beforehand, and a predetermined diaphragm aperture and shutter speed are controlled. There is also known an exposure control system in which the diaphragm aperture is determined preferentially beforehand, and then the shutter speed is automatically controlled commensurate with the brightness of a photographic object for the diaphragm aperture thus determined. Moreover, an exposure control system is known in the field of single reflex cameras incorporating an automatic stopping-down means with such improvements, as for example, the shutter speed is selected preferentially beforehand, then the diaphragm aperture is automatically controlled commensurate with the brightness of an object, with the pre-selected shutter speed.

Each of the above types of exposure control systems has its respective advantages and disadvantages, and thus it cannot be determined which one of them is the best exposure control system from every point of view. In other words, it would be preferable to select one of the three systems, depending on the condition of a scene. However, prior art cameras permit the use of only one or two of the aforesaid exposure control systems, thus failing to afford the selective use of all of the aforesaid three composure control systems in a single camera.

SUMMARY OF THE INVENTION

It is an object of the present invention to provide a multi-exposure control device for use in a camera, which permits the selective use of (i) an exposure control wherein the diaphragm aperture and shutter speed are determined beforehand, (ii) automatic shutter speed control, in which the diaphragm aperture is determined beforehand, and (iii) automatic diaphragm aperture control, in which the shutter speed is determined beforehand.

It is another object of the present invention to provide a multi-exposure control device for use in a camera in which an exchangeable lens provided with the commercially-available automatic stopping-down mechanism, which is not specifically designed for automatic diaphragm aperture control, permits the selective use of (i) an exposure control with the diaphragm aperture and shutter speed determined beforehand, (ii) automatic shutter speed control with the diaphragm aperture determined beforehand, and (iii) automatic diaphragm aperture control with the shuttter speed determined beforehand.

It is a further object of the present invention to provide a multi-exposure control device for use in a camera, which prevents errors incurred with the control system due to the variation in voltage of an electric power source, which variations are caused by two electromagnets being simultaneously excited, by preventing excitation of the second electromagnet during the time when the first electromagnet is excited, the aforesaid first and second electromagnets being used for controlling the diaphragm aperture and shutter speed, respectively.

According to the present invention, for achieving the aforesaid objects, there is provided a multi-exposure control device for use in a camera of the type which includes: structure for use with an objective lens for stopping-down the diaphragm from its open position, prior to exposure, according to the releasing operation of the shutter; diaphragm adjusting means for stopping the diaphragm to preset the diaphragm aperture against the aforesaid stopping-down operation, prior to the commencement of exposure in association with the releasing operation of the shutter; a shutter speed selecting member switchable either to a first mode wherein the shutter speed may be set manually beforehand or to a second mode, in which the shutter speed may be automatically controlled; an output circuit co-acting with the shutter speed selecting member and which produces an output commensurate to the selected shutter speed and producing an extremely small output in the second mode as compared with the output generated in the first mode; and a light measuring circuit which includes a light receiving element adapted to receive the light which has passed through the objective lens and diaphragm aperture, and which produces an automatic exposure control signal commensurate with the brightness of the light incident on the light receiving element. A feature of the aforesaid multi-exposure control device according to the present invention is that there is provided a switching member movable to a first position, in which automatic exposure control is effected so as to control exposure depending on the shutter speed and diaphragm aperture which have been determined beforehand. The switching member is movable to a second position, in which the shutter speed and/or the diaphragm aperture are automatically controlled commensurate with the brightness of an object. When the shutter speed selecting member is in the first mode (the shutter speed is selected manually), a diaphragm control circuit, into which an output of the light measuring circuit and the output of the output circuit are to be fed, both the aforesaid outputs with each other. When the output of the output circuit is detected to be greater than, or equal to, the output of the light measuring circuit, a first electromagnet, adapted to operate a locking member for locking the diaphragm from its stopping-down operation according to the aforesaid automatic stopping-down means, is operated to determine the diaphragm aperture. Subsequently, the light measuring output depending on the stopped-down diaphragm aperture is fed into an exposure time control circuit. Then, the output of the exposure time control circuit excites a second electromagnet to control the shutter speed.

When the shutter speed selecting member selects the second mode (shutter speed is automatically controlled), the diaphragm is stopped-down to that diaphragm aperture which has been adjusted by means of the aforesaid diaphragm adjusting means, and then the stopping-down light measuring output dependent upon the diaphragm aperture thus determined, is fed into the exposure time control circuit to automatically control the shutter speed. In contrast thereto, when the switching member is in the first mode (manual exposure control), the output of the output circuit, rather than the output of the aforesaid light measuring circuit, is fed into the exposure time control circuit, while a diaphragm control circuit which in connected is series to the first electromagnet to control the diaphragm is shortcircuited into an inoperable condition.

According to the present invention, the diaphragm is controlled by a locking member which is operated by the first electromagnet operable according to the output of the diaphragm control circuit, when the diaphragm is automatically controlled. In case the diaphragm is adjusted manually beforehand, the diaphragm is adjusted by the diaphragm adjusting means. Accordingly, in the case of automatic diaphragm control, the diaphragm should be adjusted to a minimum aperture by the diaphragm adjusting means. But in the case of the manual diaphragm adjustment, the diaphragm control circuit should not excite the first electromagnet. For this reason, in the case of automatic exposure control, the shutter speed selecting member selects so that the output of the output circuit is extremely small, as compared with the output of the light measuring circuit, in an attempt not to excite the first electromagnet. But, in the case of manual exposure control, the diaphragm control circuit should be shortcircuited until the diaphragm is stopped-down to a minimum diaphragm aperture.

Meanwhile, the exposure time control circuit is controlled according to the output of the light measuring circuit, which output is obtained with the stopped-down diaphragm aperture, and with the switching member in the second position (automatic exposure control), regardless of whether the shutter speed selecting member is in the first mode (shutter speed is manually set) or in the second mode (shutter speed is automatically controlled).

Thus in the case where the shutter speed is selected manually and an optimum exposure may not be achieved, even if the diaphragm is controlled to its open position or to its minimum aperture, an optimum exposure may be achieved at an optimum shutter speed which is lower that that selected at the diaphragm open position, or an optimum exposure may be achieved, with the diaphragm controlled to its minimum aperture but at a shutter speed higher than that selected manually.

Moreover, the exposure time control circuit is controlled according to the output of the output circuit, which output depends on the shutter speed selected beforehand, when the switching member is positioned in the first position. Thus, even in the case where an optimum exposure control may not be achieved at a pre-adjusted diaphragm aperture and a selected shutter speed, the exposure may be manually controlled.

According to the present invention, in the case where the shutter speed selecting member is in the second mode (automatic shutter speed control), the switching member is not positioned in the first position (manual exposure control).

Further, according to the present invention, there are provided a first electromagnet adapted to control the diaphragm and a second electromagnet adapted to control exposure time. Usually the exciting current for exciting an electromagnet is large. As a result, simultaneous excitation of the two electromagnets is not desirable for electric-power-source cells having limited capacities. The present invention avoids this shortcoming by bringing the second electromagnet into an excitable condition, the moment the first electromagnet has been de-energized.

BRIEF DESCRIPTION OF THE DRAWINGS

The above objects and advantages will be apparent from the following description taken in conjunction with the drawings wherein.

DETAILED DESCRIPTION

Figure 1:
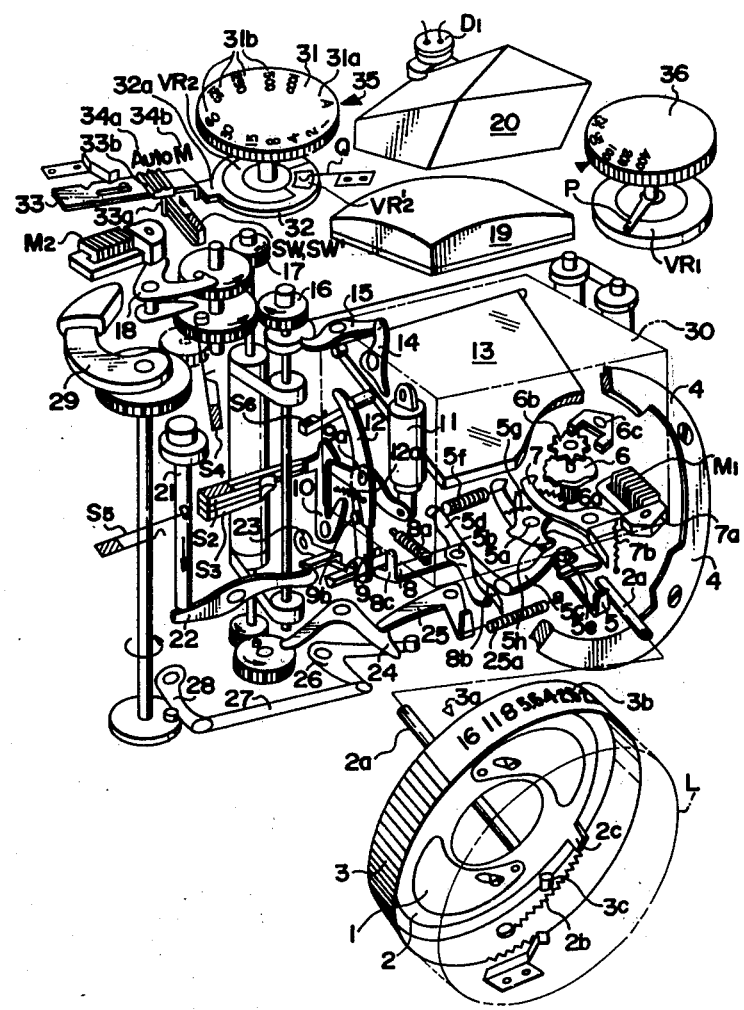
FIG. 1 is a perspective view showing the essential part of the mechanical arrangement of one embodiment of the multi-exposure control device for use in a camera according to the present invention.

With respect to FIG. 1, an exchangeable lens L having an automatic stopping-down mechanism available in the market is mounted on lens-barrel-attaching flange 4 of mirror box 30 in a camera body. Exchangeable lens L, as is well known, is provided with diaphragm ring 2 adapted to open and close diaphragm blades 1. Diaphragm ring 2 is biased to stop-down the diaphragm by spring 2b. Diaphragm preset ring 3 is rotatable relative to the lens barrel to bring graduation 3b in alignment with index 3a. When projection 2c of diaphragm ring 2 abuts projection 3c of diaphragm preset ring 3 according to the aforesaid operation, the diaphragm is arrested at a preset diaphragm aperture, against the bias of spring 2b. Diaphragm actuating pin 2a projects from the aforesaid diaphragm ring 2a towards the camera body and engages diaphragm control lever 5 within the camera body, with the exchangeable lens being mounted on the camera, so that pin 2a is retained against the bias of spring 2b, thereby maintaining diaphragm blades 1 in their open position. Then, due to diaphragm control lever 6 being moved to the left, the diaphragm is stopped-down. Accordingly, when controlling the diaphragm automatically, it is desirable that diaphragm preset ring 3 be set to a minimum diaphragm aperture, as shown in the drawing.

The diaphragm determining mechanism adapted to determine the moving position of diaphragm control lever 5 is provided in the bottom portion of mirror box 30. The diaphragm determining mechanism consists of locking lever 7 adapted to lock diaphragm control lever 5 depending on the excitation of first magnet M1, a mechanism adapted to moderate the movement of diaphragm control lever 5 to thereby ensure the positive locking by the ratchet of locking lever 7, and a mechanism adapted to provide improved accuracy of the position where the diaphragm is locked, by providing an enlarged stroke for the movement of the ratchet, as compared with the stroke of the tip of diaphragm control lever 5.

Diaphragm control lever 5 is supported on rotary shaft 5a coaxially with sector gear 5h by a spring-coupling mechanism. A loop-shaped motion system is constituted for the diaphragm control lever 5, a lever 5d which is supported on shaft 5b. An intermediate lever 5c which is linked to one end of lever 5d and spring 5f which connects the other end of the lever 5d with the diaphragm control lever 5. Pin 5e of lever 5 abuts on its one side with the hook portion of lever 5c with the aid of spring 5f. Diaphragm control lever 5 engages sector gear 5h on its one side with the aid of spring 5g.

Sector gear 5h is adapted to rotate ratchet wheel 6 coaxial therewith through the medium of pinion gear 6a, while the rotational displacement of the ratchet wheel is enlarged, as compared with the operating stroke of diaphragm actuating pin 2a. Ankle 6c is provided in opposing relation to escape wheel 6b coaxial and integral with ratchet wheel 6, thereby moderating the movement of diaphragm control lever 5 so that ratchet wheel 6 is positively locked by means of locking lever 7 which faces ratchet wheel 6.

Drive lever 8 is provided coaxially with lever 5d, thereby operating a mechanism which drives a mirror, after the aforesaid diaphragm determining mechanism has been operated. Drive lever 8 is formed with angled portion 8b adapted to engage one end of lever 5c, and biased to turn in the clockwise direction about shaft 5b by spring 8a. Drive lever 8 has other end 8c engaging braking lever 9 journaled in the side wall of mirror box 30 by shaft 9a. Coupled to braking lever 9 is air damper 11 which brakes the movements of drive lever 8 and braking lever 9, so that pin 9b engages locking lever 10 of the mirror, after a sufficient lapse of time which allows the diaphragm aperture to be determined, so that the locking condition of locking lever 10 is released to operate mirror drive lever 12. Braking lever 9 is locked by release lever 23 which releases the aforesaid locking condition by intermediate lever 22 due to the depression of release button 21.

Figure 7:
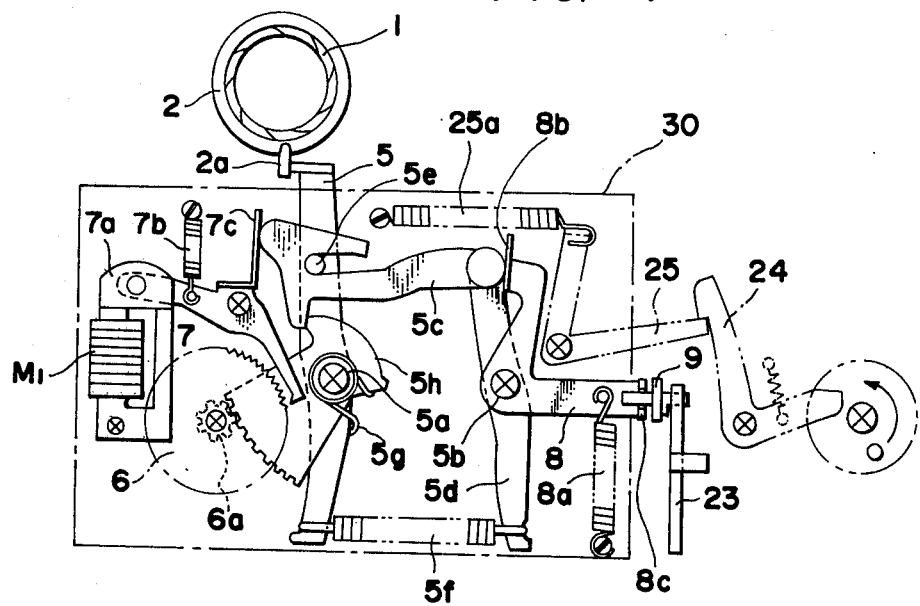
FIG. 7 is a partial plan view of the mechanism in FIG. 1 before the shutter is released.
Figure 8:
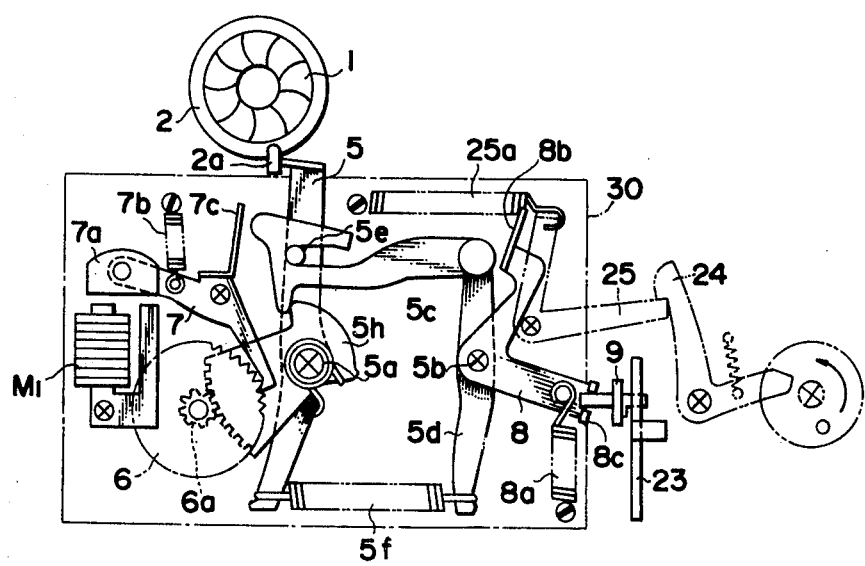
FIG. 8 is a partial plan view as in FIG. 7 but with the shutter released and prior to rear shutter curtain movement.

The following description is more clearly understood with reference to FIGS. 7 and 8.

When the depression of release button 21 causes release lever 23 to be operated, then drive lever 8 rotates about shaft 5b in the clockwise direction from the position shown in FIG. 7, therby freeing loop-shaped motion system 5c, 5d, 5f, 5e, 5, so that diaphragm actuating pin 2a moves diaphragm control lever 5 under the bias of spring 2b. Thus lever 5 is rotated about shaft 5a in the clockwise direction, whereupon sector gear 5h is rotated about shaft 5a. This rotates ratchet wheel 6 in the counterclockwise direction by pinion 6a. In this respect, the rotation of ratchet wheel 6 is moderated by ankle 6c and escape wheel 6b, so that the diaphragm is stopped-down at a low speed, while the light which has passed through the diaphragm aperture from an object is reflected by mirror 13, condenser lens 19, pentaprism 20 and the like, to be incident on the light receiving surface of photoelectric element D1. At the time when the diaphragm is stopped-down to an optimum aperture, first magnet M1 is de-energized, so that the attracting force of armature 7a of locking lever 7 is released, whereby locking lever 7 is rotated clockwise by spring 7b and brought into a locking condition with the ratchet portion of ratchet wheel 6. The above locking operation stops the rotations of ratchet wheel 6 and sector gear 5h, whereupon the loop-shaped motion system 5, 5c, 5d, 5f, 5e is stopped to stop diaphragm actuating pin 2a, thus determining the diaphragm aperture for exchangeable lens L.

The ensuing clockwise rotation of drive lever 8 and braking lever 9 is moderated or slowed down by means of damper 11 to thereby operate locking lever 10 to release switches S2, S3, which in turn releases the locking condition of mirror drive lever 12. As a result, mirror drive lever 12 is rotated by spring 12a to thereby open a switch S6 and also to rotate mirror 13 from its viewing position to its picture-taking position. Upon the termination of the rotation of the mirror 13, forward-curtain-locking lever 15 is released through lever 14, thus releasing the locking condition of the shutter forward curtain. At this time, the condition of the mechanism in FIG. 7 is changed to that of as shown in FIG. 8.

After the movement of the forward curtain with the lapse of an optimum exposure time for the diaphragm aperture which has been stopped-down, second magnet M2 is turned off, so that lever 18 carrying the armature of magnet M2 allows the rear curtain to move, thus completing exposure. Upon completion of the movement of the rear shutter curtain, stopping lever 24 is disengaged from lever 25 to enable it to rotate counterclockwise by spring 25a, which engages angled portion 8b to rotate drive lever 8 counterclockwise against spring 8a. This rotates loop-shaped motion system 5, 5c, 5d, 5f, 5e counterclockwise with sector gear 5h and ratchet wheel 6 locked by locking lever 7. Upon completion of the movement of the loop-shaped motion system, the left-hand tip of the intermediate lever 5c engages leaf spring 7c mounted on locking lever 7 to rotate lever 7 counterclockwise. This enables section gear 5h and ratchet wheel 6 to return to the position shown in FIG. 7 by spring 5g.

Meanwhile, the cocking of spring 25a of return lever 25 is effected due to the winding operation by lever 28 through the operation of levers 28, 27, 26. Additionally, film sensitivity setting dial 36 is rotatably supported on the camera body. Sliding element P rotates coaxially and integrally with film-sensitivity setting dial 36 and slides on potentiometer VR1 to provide a signal representative of the film sensitivity.

Figure 3:
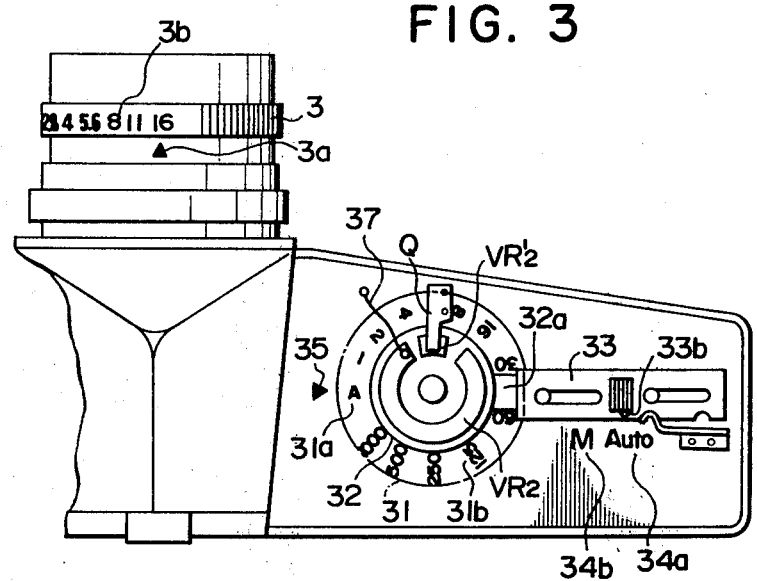
FIG. 3 is a partial top view of a camera according to the aforesaid embodiment.

As shown in FIGS. 1 and 3, shutter speed dial 31 is rotatably supported on the camera body and provided with automatic exposure control graduations 31a, 31b for use in setting the shutter speed manually. Thus, the shutter speed may be selected beforehand by bringing either of graduations 31a, 31b in alignment with index 35 on the camera body. A variable resistor and terminal VR2 are provided on disc 32 which rotates coaxially but integrally with shutter speed dial 31, while sliding element Q and one end 37 of the aforesaid variable resistor constitute a manual exposure time setting potentiometer VR2, when shutter speed dial 31 is in the manually selecting position 31b. In addition, disc 32 is formed with projection 32a. Switching member 33 is adapted to abut projection 32a and is slidably mounted on the camera body. Switching member 33 is adapted to slide so as to bring knob 33b into alignment either with index 34a representing the automatic exposure control (AUTO) or with index 34b representing manual exposure control (M).

Actuating pin 33a actuates change-over switches SW and SW', the functions of which are described hereinafter, depending on the sliding position of switching member 33. When automatic exposure time control graduation 31a of shutter speed dial 31 is in alignment with index 35, the connection between sliding element Q and the variable resistor is interrupted, and sliding element Q is connected to terminal VR2', while projection 32a of disc 32 moves index 33b to the left, when the index 33b of switching member 33 is in manual position 34b represented by M, so that index 33b is brought into alignment with the automatic exposure control graduation 34a (AUTO). As a result, when shutter speed dial 31 is rotated to the manual shutter speed region 31b, switching member 33 can move to the right, and index 33b is aligned with manual exposure control graduation 34b. Additionally, when shutter speed dial 31 indicates automatic exposure, projection 32a prevents switching member 33 from moving to automatic exposure control position 34b.

Figure 2:
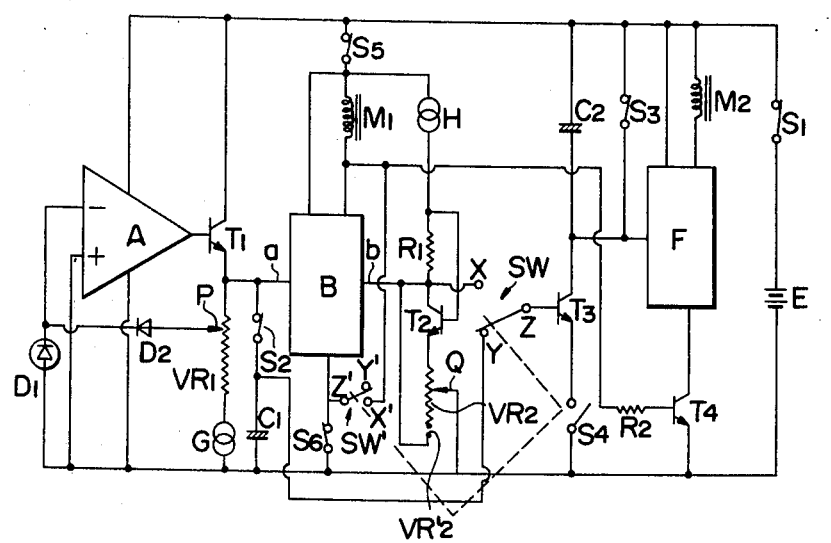
FIG. 2 is an electric circuit diagram used in the aforesaid embodiment.

FIG. 2 shows one embodiment of the control circuit according to the present invention. A represents an operational amplifier for use in light measurement, B represents a differential switching circuit for use in diaphragm control, F is an ordinary switching circuit for use in exposure time control, and E is a battery cell power source. The input on the positive side of operational amplifier A is connected to the negative pole of battery E, while the negative input thereof is connected to the cathode of photoelectric element D1. The anode of photoelectric element D1 is connected to the negative pole of battery E. The output of operational amplifier A is connected to the base of transistor T1. The emitter of transistor T1 is connected to constant current source G through potentiometer VR1, the resistance of which is selected by the setting of the film-sensitivity-setting member of FIG. 1. The other terminal of constant current source G is connected to the negative pole of battery E. The potential at sliding terminal P of potentiometer VR1 is negatively fed back to the negative input of operational amplifier A.

Photoelectric element D1, operational amplifier A, transistor T1, potentiometer VR1, constant current source G and logarithmic converting diode D2 constitute a light measuring calculating circuit, i.e., an automatic exposure time signal generating circuit, which photographically calculates a voltage proportional to the logarithm of the brightness of the light impinging on the surface of photoelectric element D1 as well as a voltage representative of the film sensitivity.

The emitter terminal of transistor T1 is connected to storage capacitor C1 by switch S2 and to input terminal a of differential switching circuit B. The output of differential switching circuit B is connected to first magnet M1 for use in determining the diaphragm aperture. Differential switching circuit B is connected to the positive pole of battery E through switches S5, S1 as well as to the negative pole of battery E through switch S6.

Switches S1, S5, resistor R1 of constant current source H, collector-emitter manual exposure time selecting potentiometer VR2 of transistor T2, sliding terminal Q thereof and a closing circuit for the negative pole of battery E constitute an output circuit. The collector of transistor T2 is connected to input terminal b of differential switching circuit B. Change-over switches SW, SW' are three-terminal-change-over swtiches for use in automatic exposure control and manual exposure control, and adapted to be switched in interlocking relation by means of switching membeer 33 (FIG. 1) which switches from automatic exposure control to manual exposure control and vice versa, having common contacts Z, Z', contacts Y, Y' for automatic exposure control, and contacts X, X' for manual exposure control. Contact X of switch SW is connected to the collector of transistor T2, and contact Y is connected to the positive terminal of storage capacitor C1. Common contact Z is connected to the base of transistor T3 for use in antilogarithmic conversion. Contact X' of switch SW' is connected to the output terminal connected to first magnet M1 of differential switching circuit B. Contact Y' is kept open, and common contact Z' is connected to the junction of differential switching circuit B and switch S6. The emitter of transistor T3, for use in anti-logarithmic conversion, is connected to the negative pole of battery E through switch S4 for use in starting counting the exposure time. The collector of transistor T3 is connected to integrating condenser C2, for use in exposure time control, as well as to the positive pole of battery E through switch S1.

The base of transistor T4, in exposure time control circuit F, is connected to the output terminal connected to first magnet M1 through resistor R2. Magnet M1 is connected to the output of differential switching circuit B, and the emitter of transistor T4 is connected to the negative pole of battery E. The collector of transistor T4 is connected to exposure time control circuit F. The output of exposure time control circuit F is connected to second magnet M2 for use in exposure time control. Switch S3 is connected in parallel to integrating condenser C2 to discharge it.

Switching from automatic diaphragm control mode, wherein the shutter speed is preferentially selected, to the automatic shutter speed control mode is accomplished by aligning of switching member 33 with the AUTO - position 34a, so that switches SW, SW' are changed over to contacts Y, Y', respectively. Then, shutter speed dial 31 is rotated into alignment with index 35, and the automatic exposure symbol 31a on dial 31 is aligned with index 35. Then, the diaphragm adjusting ring 3 is brought into alignment with a desired diaphragm aperture setting.

When electric-power-source switch S1 is closed, then a logarithmically compressed voltage of the brightness of the light received, which has passed through the diaphragm aperture, as well as an automatic exposure time control signal, which depends on the film sensitivity set by the potentiometer VR1, are generated across the emitter and the base of transistor T1, by photoelectric element D1. On the initial stroke of the depression of shutter button 21, switch S5 is closed, and when shutter button 21 is further depressed, the locking condition of braking lever 9 is released due to the rotation of release lever 23 which rotates drive lever 8, so that diaphragm 1 is shifted, with the lapse of time, from its open position to its minimum aperture by means of the automatic stopping-down mechanism. As the diaphragm is being stopped-down, photoelectric element D1 detects the brightness relative to the diaphragm aperture, while the output of the light measuring calculating circuit connected to terminal *a* produces an automatic exposure time signal voltage corresponding to the diaphragm aperture which varies during the aforesaid stopping-down operation and the film sensitivity.

Further, the manual exposure time signal generating circuit is constituted by closed switch S5, constant current source H, transistor T2 and potentiometer VR2. Potentiometer VR2 of the manual-exposure-time-signal-generating circuit affords a linear resistance characteristic. Thus, a voltage signal for a selected manual exposure time is generated in the collector of transistor T2 connected to input terminal *b*. The aforesaid automatic exposure time signal and output terminals *a*, *b* of diaphragm control circuit B, respectively. First magnet M1 connected to the output of the diaphragm control circuit is rendered conductive when the automatic exposure time is shorter than the manually set exposure time. First magnet M1 is rendered non-conductive when the automatic exposure time is equal to or longer than the manually set exposure time.

In case the diaphragm is automatically controlled, with the exposure time preferentially selected, then shutter dial 31 is rotated to bring graduation 31*b* into alignment with a desired shutter speed, for example, 1/125 seconds. Thus, potentiometer VR2 is set to a resistance corresponding thereto. Simultaneously with the closure of switch S5 on the initial stroke of the depression of shutter button 21, if the potential of the automatic exposure control signal at input terminal *a* is higher than the potential of the manual exposure time signal, i.e., if the automatic exposure time when the diaphragm is opened is shorter than 1/125 seconds, then first magnet M1 is rendered conductive to attract locking lever 7 thereto, while releasing the locking condition of ratchet wheel 6, and the diaphragm is ready to be stopped-down. When shutter button 21 is depressed and the diaphragm is shifted from its open position to the position to be stopped-down, the output at terminal *a* reaches the potential corresponding to 1/125 seconds, which has been manually set at terminal *b*. Then diaphragm control circuit B is reversed, so that the conductivity of first magnet M1 is interrupted, thereby releasing locking lever 7, thus locking the diaphragm, whereby the diaphragm aperture is set to the diaphragm aperture corresponding to the exposure time 1/125 seconds, which has been selected manually beforehand. Additionally, an exposure time signal voltage, which corresponds to the diaphragm aperture thus determined, is charged by storage capacitor C1, even if the light from an object is no longer incident on photoelectric element D1, due to the mirror being swung up, because of the fact that the switch S2 is opened simultaneously with the upward swinging of the mirror.

The voltage thus stored is impressed on the base of transistor T3 through contact Z of change-over switch SW. Moreover, the base of transistor T4, in the exposure time control circuit F, is connected through resistor R2 to the output terminal of first magnet M1 for determining the diaphragm aperture in the diaphragm control circuit B, so that first magnet M1 remains non-conductive. Thus, when the diaphragm is locked, the base potential of transistor T4 is raised and the voltage across the collector and the emitter thereof becomes almost zero, while power source voltage is impressed on the exposure time control circuit F, and second magnet M2, for controlling exposure time, is rendered conductive. When the mirror is swung up, then the forward curtain is actuated mechanically by levers 14, 15, whereupon switch S4, for counting the exposure time, is closed. Thereby, the anti-logarithmically converted current for the automatic exposure time signal voltage which has been charged in storage capacitor C1 flows through the collector of transistor T3 to charge integrating capacitor C2. Discharging switch S3 is designed to be opened prior to the starting of the travel of the shutter forward curtain, and when the charging voltage of capacitor C2 reaches a reversing level set in the exposure time control circuit F, then the output thereof is reversed, so that second magnet M2 remains non-conductive and then the shutter rear curtain moves to close the shutter.

In the automatic control mode, wherein the exposure time is preferentially determined, it is not known to what diaphragm aperture the diaphragm is stopped-down by first magnet M1, so that diaphragm adjusting ring 3 should be set to the minimum diaphragm aperture, as has been described earlier. However, if the brightness of an object is too high, and hence even if the diaphragm reaches a minimum diaphragm aperture, the potential at input terminal *a* is higher than that at input terminal *b*, then diaphragm determining magnet M1 remains conductive. However, if switch S6 is opened simultaneously with the upward swinging of the mirror, first magnet M1 becomes non-conductive, while the power source voltage is impressed on the exposure time control circuit, since transistor T4 becomes conductive due to switch S6 being opened. As a result, second magnet M2 is energized. In this respect, the mere combination of the manually selected exposure time, which has been selected by means of potentiometer VR2 beforehand, with the minimum diaphragm aperture results in over-exposure. In contrast thereto, according to the present invention, an automatic exposure time for the minimum diaphragm aperture is obtained in automatic exposure time control circuit F, so that the shutter is operated at a speed higher than that corresponding to the selected exposure time, thereby presenting an optimum exposure.

However, if the brightness of an object is too low relative to the manually selected exposure time and hence if the potential at input terminal *a* is lower than that at input terminal *b*, even in the case of an open diaphragm aperture, then first magnet M1 remains non-conductive, while the diaphragm is locked to its open condition, so that the output of diaphragm control circuit B is not reversed. However, the output signal of diaphragm control circuit B renders first magnet M1 non-conductive, while the above signal is immediately transmitted to the base of transistor T4 to thereby render it conductive. As a result, exposure time control circuit F renders second magnet M2 conductive, so that exposure time control circuit F controls for an optimum exposure time in the diaphragm open condition relative to the brightness of an object.

In case the exposure time is automatically controlled, with the diaphragm adjusted preferentially, sliding element Q in potentiometer VR2 is to be short-circuited to terminal *b* through terminal VR2' (FIG. 1). This means that, by bringing automatic exposure graduation 31*a* of shutter speed dial 31 into alignment with index 35, input terminal *b* of diaphragm control circuit B is connected to a potential corresponding to the exposure time which is further biased to a speed lower than the limit of the lowest speed at which the exposure time may be automatically controlled. In addition, by feeding a current to the magnet M1, which is connected to the output of diaphragm control circuit B, until the diaphragm reaches the minimum diaphragm aperture, the diaphragm may be stopped-down from its open aperture to a desired predetermined aperture according to the diaphragm graduation 3b of diaphragm preset ring 3.

Also, after the diaphragm has been stopped-down to the preadjusted diaphragm aperture, there is generated at terminal a an output signal for automatic exposure time which depends on the diaphragm aperture and the film-sensitivity, and the voltage representative thereof is stored by storage capacitor C1. Switch S6 is opened, simultaneously with the rotation of the movable mirror, and the current to first magnet M1 is interrupted, after which exposure time control circuit F is rendered operative, as in the case where the shutter speed is selected preferentially to control the diaphragm automatically. Then, second magnet M2 is energized, so that the shutter may be controlled for a shutter speed corresponding to the voltage stored by storage capacitor C1.

In the case of automatic exposure control, regardless of whether it is diaphragm automatic control, wherein the shutter speed is selected preferentially or an exposure-time automatic control, wherein the diaphragm is preferentially adjusted, switching member 33, adapted to switch the automatic exposure control to or from the manual exposure control, is set to automatic position 34a indicated by "AUTO", while contacts Z, Z' are connected to contacts Y, Y', respectively. However, in the case of manual exposure control, switching member 33 is set to the manual position indicated by M, so that contacts Z, Z' are connected to contacts X, X', respectively.

The exposure time is set to a desired value by setting graduation 31b of shutter speed dial 31 through potentiometer VR2, so that a manual exposure time signal voltage may be generated at contact X of change-over switch SW connected to terminal b. As a result, the releasing operation causes first magnet M1 to be conductive through switch S5, contacts Y', Z' of change-over switch SW', and switch S6. In addition, when braking lever 9 is released from its locking condition by release lever 23, the diaphragm is stopped-down from its open position to an aperture which has been adjusted by diaphragm adjusting ring 3, while first magnet M1 is maintained in excited condition, thereby enabling no stopping-down and locking operations.

When the diaphragm is brought to that diaphragm aperture which has been adjusted beforehand, as has been described above, then mirror drive lever 12 is released from its locked condition, and the rotation thereof opens switch S6, so that the current to first magnet M1 is interrupted. A signal issued in this respect renders transistor T4 conductive and exposure time control circuit F operable, and then second magnet M2 is energized, so that the travel of the rear curtain after commencement of the travelling of the forward curtain is prevented. However, a manual exposure time signal voltage at contact X is impressed, as has been described, on the base of anti-logarithmically converting transistor T3 through contact Z, so that exposure time control circuit F controls the current depending on the aforesaid signal voltage to second magnet M2, so that the exposure is controlled according to the aperture value and exposure time, which have been set manually.

Figure 5:
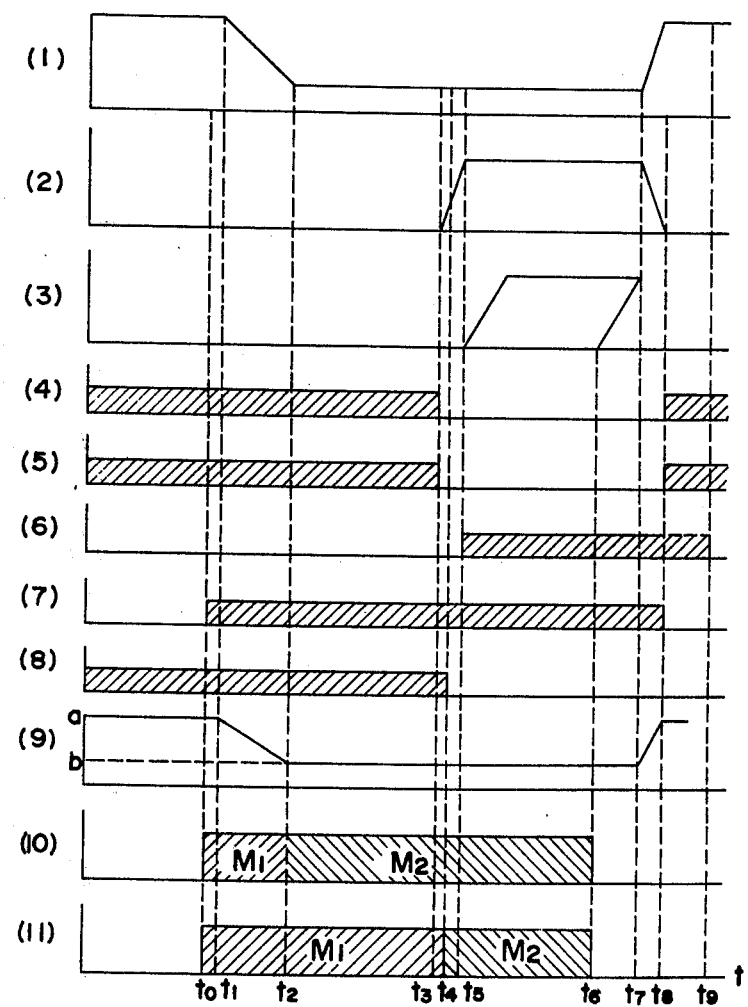
FIG. 5 is a time chart of respective signals during an exposure in the first embodiment.

FIG. 5 shows a time chart illustrating the operations of respective parts of a single reflex camera according to the present invention, in which the time is represented by the abscissa throughout the plots 5-1 to 5-11 shown therein. Plot 5-1 represents the operation of the diaphragm, with the ordinate representing the diaphragm aperture. The top portion represents the diaphragm aperture in its open position, while the lower portions represent the diaphragm being further stopped-down. Plot 5-2 represents the operation of the mirror. The ordinate represents viewing and light measuring conditions. The top horizontal line represents the picture-taking position. Plot 5-3 represents the operation of the shutter, while the ordinate represents the distance which both curtains have travelled. Plots 5-4 to 5-8 represent the operations of switches S2, S3, S4, S5, S6, with the hatched portions representing the condition in which the switches are closed. Plot 5-9 represents an automatic exposure time signal voltage, with the ordinate representing voltages at the input terminal. Plot 5-10 represents the operations of the first and second magnets, where exposure time is preferentially selected and the diaphragm is automatically controlled. Plot 5-11 represents the operations of the first and second magnets in the automatic exposure time control mode, with the diaphragm determined preferentially, as well as in the case of the manual exposure control mode. $t0$ represents the time when switch S5 is closed according to the releasing operation, $t1$ represents the time when control lever 9 is released from its locked condition to allow the movement of the loop-shaped motion system, $t2$ is the time when diaphragm control circuit B is reversed to stop the motion of the loop-shaped motion system, $t3$ is the time when the mirror drive lever is released from its locked condition, $t4$ is the time when switch S6 is opened, $t5$ is the time when the travel of the shutter forward curtain is commenced, $t6$ is the time when the travel of the shutter rear curtain is commenced, $t7$ is the time when the operation of return lever 26 is commenced due to the completion of travel of the shutter rear curtain, $t8$ represents the time when the operation of the return lever 25 is completed, and $t9$ is the time when the subsequent winding is completed.

Figure 4:
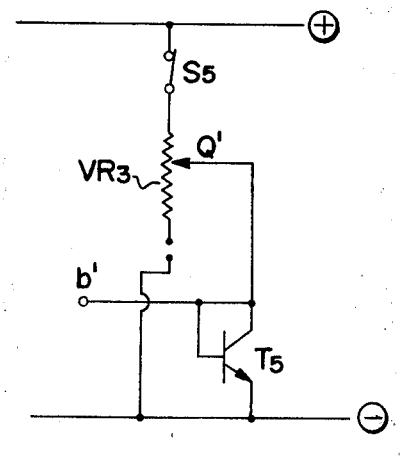
FIG. 4 is another embodiment of an output circuit according to the present invention.

FIG. 4 shows another embodiment of the potentiometer circuit which produces a manual exposure time setting signal according to the present invention. Like parts are designated like reference numerals in common with the previous embodiment. The numerals with primes represent equivalent parts. Potentiometer VR3 is connected to the battery by switch S5 which is closed due to the depression of release button 21. The variable resistance of potentiometer VR3 is in accordance with a geometrical series. Sliding element Q' is connected to the base and collector of transistor T5, as well as to terminal b', which functions similarly to the input terminal b of the previously described diaphragm control circuit B.

When the shutter speed is manually set to low speeds, then sliding element Q' shifts downwards along the variable resistor of potentiometer VR3, thereby reducing the resistance between Q' and the negative pole of the power source. When graduation 31a of shutter dial 31 is brought into alignment with index 35 for effecting automatic exposure time control, sliding element Q' shifts further downwards to be shortcircuited to the negative pole of the power source, thus presenting the same condition when the shutter speed is set to an extremely slow speed. Meanwhile, terminal b' is shortcircuited to the negative pole, so that first magnet M1 is conductive, irrespective of the brightness of an object, and continues its energized condition, until the diaphragm is stopped-down to the aforesaid preadjusted diaphragm aperture, even if the diaphragm aperture has been preset to any other diaphragm aperture.

Figure 6:
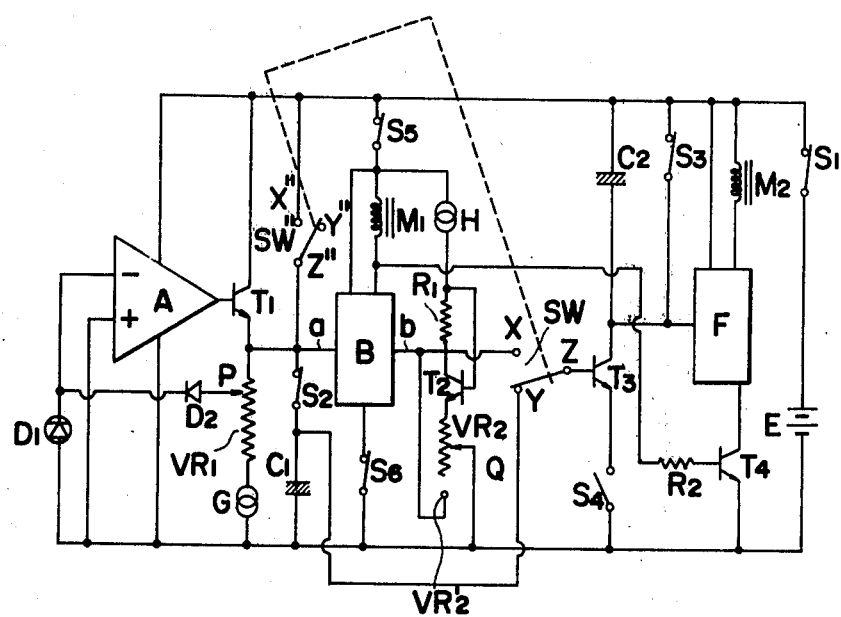
FIG. 6 is a modified circuit diagram of the embodiment of FIG. 2.

FIG. 6 shows a modification of the embodiment shown in FIG. 2. The structure of FIG. 6 differs from that of FIG. 2 in that switch SW' is replaced by switch SW'', the other components remaining the same as those of FIG. 2. In this respect, like parts are designated like reference numerals. Switch SW'' maintains the energized condition for first electromagnet M1, as in the case of switch SW' of FIG. 2.

Switch SW' in FIG. 2 is connected to bias differential switching circuit B which controls the diaphragm, whereas switch SW'' of FIG. 6 is connected between input terminal $a$ of differential switching circuit B and the positive pole of power source E. When contact Z'' is connected to contact X'', the potential at input terminal $a$ of differential switching circuit B is maintained at the level of the positive pole of the battery E. Accordingly, the potential at input terminal $a$ is maintained higher than the potential at input terminal $b$, irrespective of the setting of the potential at input terminal $b$ as well as the output of operational amplifier A, so that the excited condition of first magnet M1 due to differential switching circuit B may be maintained. Also, the interlocking relation between switch SW'' and switch SW is similar to the interlocking relation between switch SW' and switch SW in FIG. 2.

As is apparent from the foregoing description of a multi-exposure control device according to the present invention, the switching of the manual exposure control mode to and from the automatic exposure control mode may be effected by bringing switching member Q in alignment with the respective graduations. In addition, in the automatic exposure control mode, the device according to the present invention permits, by means of the shutter speed dial, switching among (i) the automatic control mode wherein the shutter speed is automatically controlled, with the diaphragm adjusted preferentially, (ii) the automatic control mode wherein the diaphragm is controlled, with the shutter speed selected preferentially, and (iii) the exposure control mode, wherein after the diaphragm aperture has been determined, with the shutter speed selected preferentially, the shutter speed is controlled for a shutter speed which is different from the shutter speed which has been selected according to the aforesaid stopping-down light measuring output.

What is claimed is:

1. A multi-exposure control device for a camera, comprising:
    an objective lens and a variable diaphragm;
    means for automatically stopping-down said diaphragm from an open position prior to commencement of exposure in association with the release operation of the camera shutter mechanism;
    diaphragm adjusting means for stopping said diaphragm;
    means for selecting shutter speed providing a first mode for manual selection of shutter speed and a second mode for automatic shutter speed control;
    means for generating an output signal corresponding to the shutter speed manually selected in said first mode;
    means for producing an automatic exposure time control signal corresponding to the light passing through said objective lens and said diaphragm aperture;
    a diaphragm control circuit for comparing said automatic exposure time control signal with said output signal and enabling said diaphragm adjusting means to stop the diaphragm when a predetermined relationship exists between said output signal and said automatic exposure time control signal;
    means for stopping said diaphragm at a manually selected aperture;
    means for terminating exposure;
    an exposure time control circuit for controlling said means to terminate exposure in accordance with said automatic exposure time control signal;
    a switching member movable between a first position for effecting manual exposure control based on manually selected shutter speed and diaphragm aperture and a second position for effecting automatic exposure control for automatically controlling said diaphragm aperture and shutter speed; and
    means for connecting said output signal to said exposure time control circuit and for disconnecting said automatic exposure time control signal to said exposure time control circuit with said switching member in said first position.

2. A multi-exposure control device as in claim 1 wherein said means for producing an automatic exposure time control signal includes a light measuring element and said signal is proportional to the logarithmic value of the light intensity impinging on said light measuring element, said output signal varies arithmetically relative to the geometrical shutter speed variation manually selected in said first mode, and said exposure time control circuit anti-logarithmically converts said automatic exposure time control signal.

3. A multi-exposure control device as in claim 1 further comprising means for interrupting the operation of said means for terminating exposure during operation of said diaphragm adjusting means and for enabling operation of said means for terminating exposure when said diaphragm adjusting means is inoperative.

4. A multi-exposure control device as in claim 1 further comprising means for arresting said switching member in said second position with said means for selecting in said second mode.

* * * * *